(12) United States Patent
Le et al.

(10) Patent No.: US 8,175,037 B2
(45) Date of Patent: *May 8, 2012

(54) METHOD FOR UPDATING A ROUTING ENTRY

(75) Inventors: Franck Le, Irving, TX (US); Stefano M. Faccin, Dallas, TX (US)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/575,129

(22) Filed: Oct. 7, 2009

(65) Prior Publication Data

US 2010/0023765 A1  Jan. 28, 2010

Related U.S. Application Data

(63) Continuation of application No. 10/247,567, filed on Sep. 20, 2002, now Pat. No. 7,756,073.

(51) Int. Cl.
 *H04W 4/00* (2009.01)
 *H04L 12/28* (2006.01)
 *H04L 9/32* (2006.01)
 *G06F 15/173* (2006.01)
 *G06F 17/30* (2006.01)
 *H04M 1/66* (2006.01)

(52) U.S. Cl. ........ 370/328; 370/389; 709/230; 713/168; 455/411; 455/432.1; 716/26

(58) Field of Classification Search .................. None
See application file for complete search history.

(56) References Cited

U.S. PATENT DOCUMENTS

| | | |
|---|---|---|
| 5,537,474 A | 7/1996 | Brown et al. |
| 5,668,875 A | 9/1997 | Brown et al. |
| 6,578,085 B1 | 6/2003 | Khalil et al. |
| 6,636,498 B1 | 10/2003 | Leung |
| 6,707,809 B1 | 3/2004 | Warrier et al. |
| 6,792,474 B1 | 9/2004 | Hopprich et al. |
| 6,915,325 B1 | 7/2005 | Lee et al. |
| 6,947,401 B2 | 9/2005 | El-Malki et al. |
| 6,980,802 B2 | 12/2005 | Jung |
| 6,987,771 B2 | 1/2006 | Shimizu et al. |
| 6,999,436 B2 | 2/2006 | Zheng et al. |
| 7,136,362 B2 | 11/2006 | Chen |
| 2001/0012777 A1 | 8/2001 | Igarashi et al. |
| 2002/0133607 A1 | 9/2002 | Nikander |
| 2002/0147820 A1 | 10/2002 | Yokote |
| 2003/0026241 A1 | 2/2003 | Ono et al. |
| 2003/0142650 A1 | 7/2003 | Fan |
| 2003/0142673 A1 | 7/2003 | Patil et al. |

(Continued)

OTHER PUBLICATIONS

S. Jacobs et al., "Security of Current Mobile IP Solutions," Proc. of IEEE Milcom 1997, pp. 1122-1128, Nov. 2-5, 1997.

(Continued)

*Primary Examiner* — Nittaya Juntima

(57) ABSTRACT

The present invention concerns method for updating a routing entry BC for a communication partner node CN communicating with a communication originating node MN via a network containing at least one routing node HA, the method comprising the steps of: requesting 1. a routing entry update from said communication originating node MN to said communication partner node CN, wherein said update request contains at least an identification BUIN of the request, submitting 2. request verification information, associated to said identification BUIN of the update request, from said communication originating node MN to said at least one routing node, requesting 4. verification of said routing entry update by said communication partner node CN to said routing node HA using said identification BUIN of the update request, retrieving 5. said request verification information from said routing node based on said identification BUIN of the update request.

19 Claims, 1 Drawing Sheet

U.S. PATENT DOCUMENTS

2003/0211842 A1 11/2003 Kempf et al.
2004/0008845 A1 1/2004 Le et al.
2004/0013116 A1 1/2004 Greis et al.

OTHER PUBLICATIONS

International Search Report, PCT/IB03/04036 (PCT counterpart application), Aug. 13, 2004.
Perkins, C.E., "Mobile IP," IEEE Communications Magazine, vol. 35, No. 5, pp. 84-99, May 1, 1997.
Mankin A., et al., "Threat Models Introduced by Mobile IPv6 and Requirements for Security in Mobile IPv6," Internet Draft, Nov. 5, 2001.
Faccin, S.M., et al., "A Secure and Efficient Solution to the IPv6 Address Ownership Problem," IETF Mobile IP, pp. 162-166, Sep. 9, 2002.
Johnson, D.B., "Mobility Support in IPv6 ,Draft-IETF-MobileIP-IPV6-14.TXT>," Internet Draft, XX, XX, Jul. 2, 2000.
Communication from the European Patent Office regarding application 03 797 470.6, dated May 5, 2006.
Communication from the European Patent Office regarding application 03 797 470.6, dated Aug. 4, 2005.
Final Office Action on U.S. Appl. No. 10/247,567, mailed Jan. 24, 2008.
Final Office Action on U.S. Appl. No. 10/247,567, mailed Nov. 18, 2008.
International Preliminary Report on Patentability for PCT/IB2003/004036, completed Jan. 10, 2005.
Non-Final Office Action on U.S. Appl. No. 10/247,567 mailed Mar. 4, 2009.
Non-Final Office Action on U.S. Appl. No. 10/247,567, mailed May 29, 2008.
Non-Final Office Action on U.S. Appl. No. 10/247,567, mailed Aug. 8, 2007.
Non-Final Office Action on U.S. Appl. No. 10/247,567, mailed Sep. 20, 2006.
Notice of Allowance on U.S. Appl. No. 10/247,567, mailed Apr. 19, 2007.
Notice of Allowance on U.S. Appl. No. 10/247,567, mailed Jul. 9, 2009.

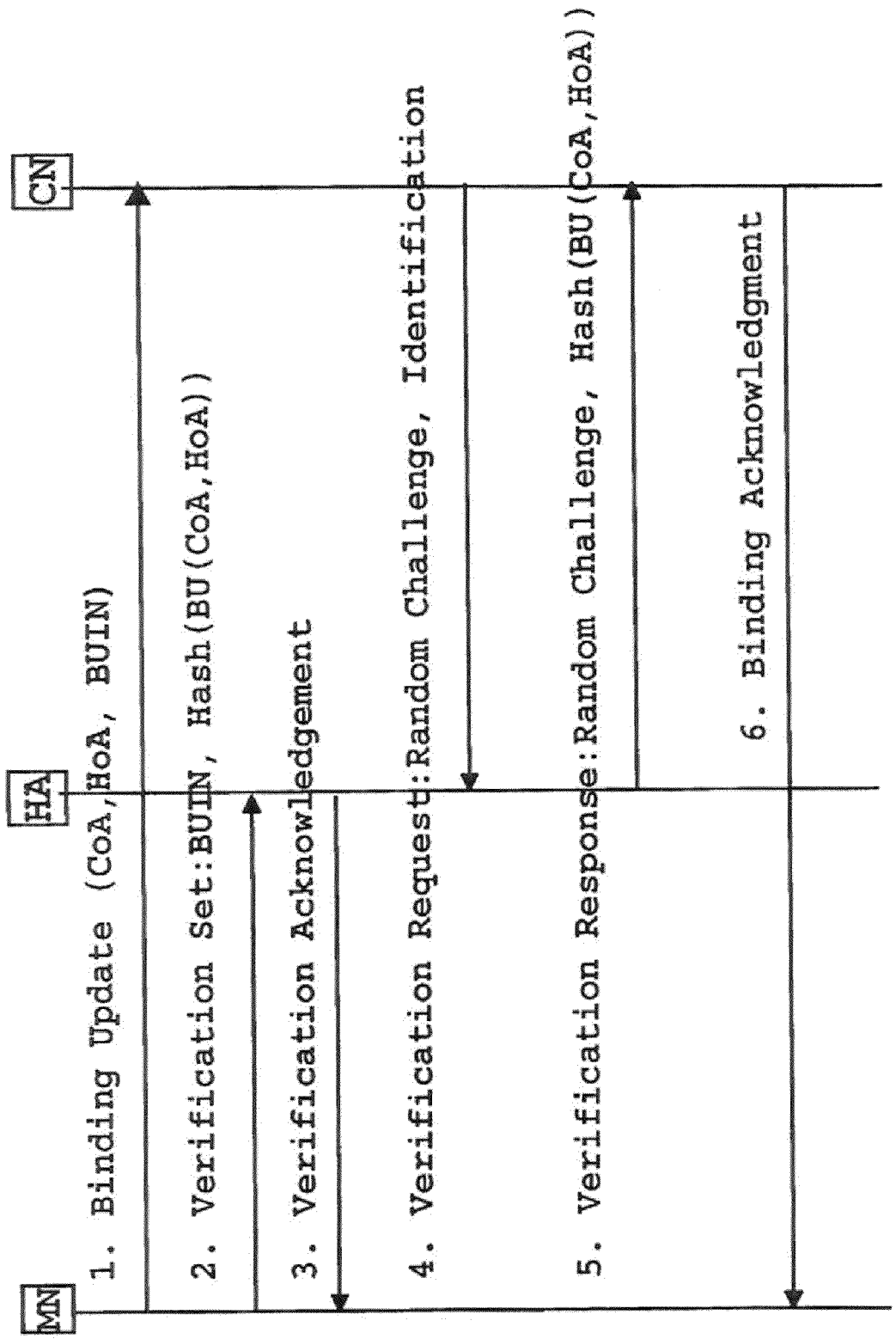

METHOD FOR UPDATING A ROUTING ENTRY

CROSS REFERENCE TO RELATED APPLICATIONS

This application is a Continuation Application of U.S. application Ser. No. 10/247,567, filed Sep. 20, 2002, now U.S. Pat. No. 7,756,073, the entire contents of which are hereby incorporated by reference in its entirety.

FIELD OF THE INVENTION

The present invention relates to a method for updating a routing entry. More particularly, the present invention relates to a method for updating a routing entry for a communication partner node communicating with a communication originating node via a network containing at least one routing node.

BACKGROUND OF THE INVENTION

As stated above, the present invention relates to a method for updating a routing entry for a communication partner node communicating with a communication originating node via a network containing at least one routing node.

In this connection, it is to be noted that the present invention is not limited to a specific network type, but may be applied to any network type allowing a communication partner node to communicating with a communication originating node via at least one routing node. For example, the invention is applicable to a communication network operated on the basis of the Internet Protocol IP, irrespective of the version of the Internet protocol, i.e. whether it is IPv4 or IPv6. Also, the present invention is applicable in case the communication nodes (originating and partner node) are fixed nodes and/or mobile nodes which can be freely connected at an arbitrary access point to the network. The type of connection, i.e. whether wirebound or wireless also does not matter for the purpose of the present invention. In case of a wireless network access and assuming an IP based network, then for example the so-called Mobile IP MIP protocol is used (MIPv4 or MIPv6). Nevertheless, other IP protocol versions or even other protocol types may be used.

In order to illustrate and explain the present invention, however, the subsequent description—without any limitation of the scope of the invention—will focus on a case in which at least the communication originating nodes are mobile nodes and the protocol used for communication is MIPv6.

Thus, with reference to the terminology used in the present invention as compared to the MIPv6 specifications, it will be evident to a skilled reader that a communication originating node will correspond to a mobile node MN, a communication partner node will correspond to a correspondent node CN, a routing node will correspond to a home agent HA (of the mobile node MN), and the routing entry to be updated will correspond to a binding cache at the correspondent node CN. Nevertheless, the present invention is not restricted to updating a routing entry at the communication partner node but it is to be noted that the routing entry can be physically separated from the communication partner node which remotely accesses the routing entry, so that the routing entry for the communication partner node is concerned.

In case of mobile nodes enabled to access the network at different access points, the communication originating node/mobile node MN is identified by a fixed address also known as home address HoA and a variable address known as care_of_address CoA. The fixed address does not change but rather identifies the node ("logical location"), while the variable address changes depending on the access point of the network (e.g. after the mobile node MN roamed within the network) and corresponds a "physical location" to which messages destined for the mobile node are to be delivered.

Thus, as mentioned earlier, the present invention is related to Mobile IPv6, and more particularly is concerned with a method to securely update a routing entry for a communication partner node, i.e. to secure transmission of Binding Update messages and the binding cache for the communication partner node. The invention thus belongs to the same field as the Return Routability mechanism defined in Mobile IP, with which skilled persons are expected to be familiar, so that a description thereof is omitted here but the skilled reader is referred to Mobile IP definitions.

In more detail, this invention addresses the issues described in the IETF draft "Threat Models introduced by Mobile IPv6 and Requirements for Security in Mobile IPv6" by Allison Mankin, Basavaraj Patil, Dan Harkins, Erik Nordmark, Pekka Nikander, Phil Roberts and Thomas Narten, dated Nov. 5, 2001 and published and/or to be retrieved via www.ietf.org/proceedings/02mar/I-D/draft-ietf-mobileip-mipv6-scrty-reqts-02.txt.

To summarize the issue, in Mobile IPv6, the correspondent node CN should only accept Binding update messages (BU's) from valid mobile nodes MN, i.e. the MN that actually owns the care of address CoA sent in the Binding Update message; otherwise, an intruder or malicious node may modify the binding cache for and/or in the CN corresponding to the MN leading to several types of attacks such as those know for example as "man in the middle", "reflection", "bombing" and "denial of service" attacks (e.g. by changing the content of the binding cache in the CN from the current care of address CoA to a different address, the CN will start sending the packets to the new address and the MN will not receive them anymore).

The current Mobile IPv6 specifications mandate the Return Routability (RR) test to prevent the above mentioned identified attacks, but the security of this protocol strongly relies on the confidentiality of the home cookie sent from the CN to the MN via its home agent HA. To make sure that intruders cannot learn its value (which will allow them to send fake binding update message and update the binding cache for/at the CN), the MIPv6 specifications strongly recommend that the Encapsulation Security Protocol (ESP) should be applied between the MN and its HA. An encrypted tunnel applied between these two nodes will allow a secure transmission of the home cookie.

This assumption is, however, valid only in some environments. However, when the MN is attached to a network protected by firewalls, firewalls need to be able to filter the packets based on the source IP address, the destination IP address, the next header, the port numbers and eventually other fields/parameters (to prevent e.g. intruders to user Finger, NFS, or perform DNS (DNS: Domain Name Sever) zone transfer, TCP SYN Flood, etc.). ESP can not be applied: In such cases the firewalls will in fact have to drop all these packets since due to the application of ESP, the firewall is not capable to verify e.g. the values in the TCP header (TCP: Transmission Control Protocol). Therefore the MN won't be able to securely send any binding update BU messages.

To protect the binding update messages, two solutions have previously been proposed:

1) The Return Routability (RR) test which is defined in the Mobile IPv6 specifications and mandatory; but as described previously, this protocol is not applicable in environments with firewalls (i.e. not applicable in most networks).

2) The "CGA" proposal, also called "sucv". However this solution relies on public keys and public keys operations may be an issue for mobile nodes: they may not have the necessary computational capabilities to perform the required digital signatures and other required operations. That is why RR has been adopted in the MIPv6 specifications Thus, as explained before and summarizing, in Mobile IPv6, the correspondent node (CN) should only accept Binding update BU messages from a valid Mobile Node (MN). The current Mobile IPv6 specifications mandate the Return Routability (RR) test to prevent identified attacks, but the security of this protocol strongly relies on the confidentiality of the home cookie sent from the CN to the MN via its home agent HA. To make sure that intruders cannot learn its value (which will allow them to send fake binding update message and update the binding cache at the CN), the IPSec Encapsulation Security Protocol (ESP) mode should be applied between the MN and its HA. An encrypted tunnel applied between these two nodes allows a secure transmission of the home cookie. However if the MN is attached to a network protected by firewalls, firewalls need to be able to filter the packets based on the source IP address, the destination IP address, the next header, the port numbers and eventually other fields/parameters ESP can not be applied and the firewalls will have to drop these packets since due to the application of ESP, the firewall is not capable to verify e.g. the values in the TCP header. Therefore the MN won't be able to securely send any BU messages.

SUMMARY OF THE INVENTION

Consequently, it is an object of the present invention to provide an improved method for updating a routing entry which is free from above described problems.

According to the present invention, the above object is for example achieved by a method for updating a routing entry for a communication partner node communicating with a communication originating node via a network containing at least one routing node, the method comprising the steps of requesting a routing entry update from said communication originating node to said communication partner node, wherein said update request contains at least an identification of the request, submitting request verification information, associated to said identification of the update request, from said communication originating node to said at least one routing node, requesting verification of said routing entry update by said communication partner node to said routing node (HA) using said identification of the update request, retrieving said request verification information from said routing node based on said identification of the update request.

According to favorable further developments:
the communication originating node is identified by a fixed address and a variable address, and said update request further contains said fixed address and an assigned variable address;
said routing node acknowledges receipt of the submitted request verification information;
said verification request and said retrieving (5.) are secured by a random challenge;
said request verification information is generated by applying a cryptographic function on said update request;
said cryptographic function is a Hash-function;
said request verification information is generated by applying a cryptographic function on said fixed address and said assigned variable address contained in said update request;

said cryptographic function is a Hash-function;
the method further comprises the steps of generating at the communication partner node said request verification information based on the received routing entry update, comparing the generated request verification information with said retrieved request verification information, and updating the routing entry in case the comparison yields that the generated request verification information and said retrieved request verification information are identical;
said request verification information is generated by applying a cryptographic function on said update request;
said cryptographic function is a Hash-function.

By virtue of the present invention, basically the following advantages can be achieved:

1. This invention defines a basic new mechanism to send the a routing entry update message such as Binding Update messages securely from the MN to the CNs.

2. In particular, it allows the CN to verify through an interaction with the MN's Home Agent that the Binding Update message received from the MN is actually coming from the legitimate MN while still allowing network protection through the use of firewalls.

3. The solution described by this invention provides the same level of security (it does prevent future attacks—future attacks are a new type of attacks recently identified in the Mobile IP Working Group) as the RR prevents, while however RR prevents them by a periodic re-execution of the RR protocol.

4. It significantly reduces the numbers of messages; RR requires 6 messages between the MN and the HA and CN. The solution according to the invention requires at most only 4 messages. Namely, when considering a verification acknowledgment from HA to MN as dispensable, it requires indeed only 3 messages and thus only half the number of messages as compared to the RR test.

5. Actually, RR needs two full round trips between the MN and the CN whereas this solution only requires one. As a result, the delay and the overhead introduced by the procedure is reduced.

6. As regards the overhead, also the number of bytes to be sent over the air interfaces is significantly reduced by virtue of the present invention, as will be readily understood from the following table comparing RR test with the present invention:

| Return Routability | PRESENT INVENTION |
|---|---|
| Home Test Init Message (HoTI) 92 octets (HoTI 52 + encapsulation 40) | Verification Set 84 octets (64 + AH 20) |
| Care-of Test Init Message (CoTI) 52 octets | Verification Acknowledgement 44 octets |
| Home Test Message (HoT) 132 octets (HoT 72 + encapsulation 40 + ESP 20) | Verification Request 48 octets |
| Care-of Test Message (CoT) 72 octets | Verification Response 60 octets |
| Binding Update (BU) 72 octets | Binding update 76 octets |
| Binding acknowledgement 64 octets | Binding acknowledgement 64 octets |
| RR total: 484 octets | Total: 376 octects |

Apparently, 108 octets are saved over the air interface for each BU sent when applying the method according to the present invention; and while mobile nodes MN may be moving fast, they will have to send many BUs. MNs may have communications with several CNs, so even more Bus will need to be sent.

7. Computation requirement: RR test uses several cookies and requires several applications of the hash function whereas this solution only requires one hash operation per binding update.

8. Procedure complexity: RR requires the CN to manage different cookies and nonce's indexes. This complexity may discourage CN to implement the RR test thus preventing any Route Optimization. The solution described in this document is a lot more simpler: it does not require the CN to manage any index or internal secret thus making route optimization easier. (Note that nonce's indexes are part of the RR procedure and more detailed information on these can be retrieved from the definitions thereof.)

9. Finally as explained previously, in order to provide sufficient security for RR, it is strongly recommended to encapsulate and to encrypt the HoT message to prevent any intruder to learn the home cookie value, and firewalls need to be able to filter the packets based on the source IP address, the destination IP address, the next header, the ports numbers.

In contrast, the solution according to the present invention does not require encryption between the MN and its HA, but only authentication. Therefore, firewalls protecting the network at a location where the MN is connected (accesses the network in a wireless or wirebound fashion) are capable to filter packets that carry the binding update and security "material" specified in this application without the need to drop the packets.

10. Thus, this invention defines a new mechanism to send the Binding Update messages securely from the MN to the CNs. In particular, it allows the CN to verify through an interaction with the MN's Home Agent that the Binding Update message received from the MN is actually coming from the legitimate MN while allowing network protection through the use of firewalls. The invention proposes 3 (or at most 4) new messages to be introduced into MIPv6 or a corresponding protocol standard.

BRIEF DESCRIPTION OF THE DRAWINGS

In the following, the present invention will be described in greater detail with reference to the accompanying drawings, in which FIG. 1 shows a signaling scenario according to the proposed method according to the present invention.

DETAILED DESCRIPTION OF THE EMBODIMENTS

As will become apparent from the subsequent description, this invention defines a new procedure to send the binding update messages (routing entry update messages) securely from the communication originating node or mobile node MN to the communication partner node or correspondent node CN. In this connection, it specifies an extension to current binding update messages, i.e. a identification (identification number) of a respective binding update message, referred to as BUIN.

Additionally, an output of a cryptographic function such as the Hash function applied on a binding update message is introduced as a field of newly introduced messages named "Verification Set" and "Verification response" messages. Note that for reduced complexity the cryptographic function (e.g. Hash function) is applied to the "conventional" binding update message, i.e. those parts of the BU message sent according to the present invention which contain "only" the Home address HoA and the care_of_address of the MN, and not on the additionally included identification BUIN. Nevertheless, also the complete BU message including the BUIN may be subject to the cryptographic function according to a modification of the present invention.

The invention proposes 3, at most 4 new messages which are referred to herein below as Verification Set, Verification Acknowledgment (which is optional), Verification Request, and Verification Response. The messages are illustrated in FIG. 1 and denoted by numerals 2 to 5, respectively. Note that FIG. 1 shows only those entities involved in carrying out the present invention and the signaling there between. Signaling is depicted in horizontal direction between the entities, and in vertical direction/with increasing numbering of the step numbers, the sequence of the steps in time is represented.

The following signaling flow as illustrated in FIG. 1 thus describes the procedure in greater detail, i.e. the method for updating a routing entry such as a binding cache BC at a communication partner node CN communicating with a communication originating node MN via a network containing at least one routing node such as a home agent HA will subsequently be described in detail:

When referring to FIG. 1, it should be kept in mind that BUIN is the binding update identification number, Hash ( . . . ) denotes the output of a Hash function applied to the argument ( . . . ) of the Hash function, here the binding update message including CoA and HoA of the MN, and a Random Challenge (or RAND) is used to avoid replay attacks and to avoid bogus nodes (malicious nodes/"bad guys") impersonating the MN to act as the HA and send the reply to the CN on behalf of a legitimate HA.

Step 1.

When the MN needs to send a Binding Update to a Correspondent Node (e.g. in case of change of Care of Address (e.g. upon roaming), Binding Update lifetime expired, etc.), the MN creates the Binding Update message as specified in the MIPv6 specifications and applies a cryptographic function such as the Hash function H on it.

The resulting output is associated with a Binding Update Identification Number (BUIN). MN sends the binding update to the CN including the BUIN. Stated in other words, the BU sent according to the present invention from the MN to the CN includes the data items of a conventional BU message such as HoA and CoA, and additionally the BUIN as an identification of the BU message. The result of the Hash function applied to the "conventional" BU message is not transmitted to the CN. Alternatively, the Hash function could be applied to the entire BU message containing HoA, CoA and BUIN.

Thus, there is a requesting in step 1. of a routing entry update from said communication originating node MN to said communication partner node CN, wherein said update request contains at least an identification BUIN of the request.

Step 2.

The MN sends a BU Verification Set message to its Home Agent HA. This message contains the hashed (conventional) BU (as request verification information) and the corresponding BUIN. (Note that as previously mentioned the Hash function could be applied to the entire message including also the BUIN.) The Verification Set message is authenticated using the MN-HA security key.

Thus, there is a submitting in step 2. of request verification information, associated to said identification BUIN of the update request, from said communication originating node MN to said at least one routing node.

Step 3.

The Home agent (optionally) acknowledges the receipt of this message through a Verification Acknowledgment message.

Step 4.

On receipt of the BU, the CN extracts the identification number BUIN and sends it in a Verification Request message to the MN's Home Agent. The message includes a Random Challenge created by the CN. The message is sent to the MN home address, and the Home Agent detects the message and processes it.

Thus, there is a requesting in step 4. for verification of said routing entry update by said communication partner node CN to said routing node HA using said identification BUIN of the update request.

Step 5.

The Home Agent replies to the CN with the output of the hashed BU it previously received from the MN and by including the Random Challenge received by the CN in a verification response message.

Thus, there is a retrieving in step 5. of said request verification information from said routing node HA based on said identification BUIN of the update request.

Upon receipt of the reply, (in a processing step performed internally at the CN and not shown in the signaling diagram according to FIG. 1) the CN applies the cryptographic function, i.e. the Hash function H to the Binding Update message originally received from the MN (see step 1.) and compares the result with the hashed value received (in step 5.) from the HA. If the obtained values are the same, the CN creates the binding cache entry associating the MN HoA to the MN CoA indicated in the BU.

Thus, there is a generating at the communication partner node CN of said request verification information based on the received routing entry update, comparing the generated request verification information with said retrieved request verification information, and updating the routing entry in case the comparison yields that the generated request verification information and said retrieved request verification information are identical.

From the foregoing description of the present invention, it becomes clear that it can thus be easily implemented as new Mobile IP messages and/or as extensions to existing Mobile IP messages.

In case the present invention is applied to a different protocol as compared to Mobile IP, then of course a similar implementation is possible.

Accordingly, as has been described herein before, the present invention concerns method for updating a routing entry BC for a communication partner node CN communicating with a communication originating node MN via a network containing at least one routing node HA, the method comprising the steps of: requesting 1. a routing entry update from said communication originating node MN to said communication partner node CN, wherein said update request contains at least an identification BUIN of the request, submitting 2. request verification information, associated to said identification BUIN of the update request, from said communication originating node MN to said at least one routing node, requesting 4. verification of said routing entry update by said communication partner node CN to said routing node HA using said identification BUIN of the update request, retrieving 5. said request verification information from said routing node based on said identification BUIN of the update request.

While the invention has been described with reference to a preferred embodiment, the description is illustrative of the invention and is not to be construed as limiting the invention. Various modifications and applications may occur to those skilled in the art without departing from the true spirit and scope of the invention as defined by the appended claims.

The invention claimed is:

1. A method, comprising:
receiving, at a first communication node of a network, a request for a routing entry update from a second communication node of the network, wherein an update request includes an identification of the update request;
verifying authenticity of the update request by transmitting a request for verification from the first communication node to the routing node associated with the second communication node, the request for verification including a random challenge and the identification of the update request;
receiving, from the routing node, a verification response including information previously transmitted to the routing node by the second communication node, wherein the information previously transmitted comprises the identification of the update request; and
updating a routing entry if the authenticity of the request is verified.

2. The method of claim 1, wherein the receiving the verification response comprises:
receiving the random challenge transmitted from the first communication node to the routing node and a function of address information of the second communication node.

3. The method of claim 1, wherein the updating comprises:
applying a cryptographic function to the update request;
comparing an output of the cryptographic function to a hashed value included in the verification response received from the routing node; and
creating a binding cache entry associated with the second communication node address information indicated in the update request, if the output of the cryptographic function is the same as the hashed value.

4. The method of claim 1, further comprising:
transmitting an update acknowledgment to the second communication node of the network if the authenticity of the request is verified.

5. The method of claim 1, wherein the update request is a binding update request including a fixed address and a variable address associated with the second communication node.

6. The method of claim 5, wherein the fixed address and the variable address are associated with a home address and a care of address of the second communication node.

7. A method, comprising:
receiving, from a first communication node and a second communication node via separate communications at a routing node, a routing entry update request and a verification request associated with the update request, wherein both the update request and the verification request include an identification of the update request; and
providing a verification response to the second communication node to enable the second communication node to verify the update request and update a routing entry associated with the first node.

8. The method of claim 7, wherein the receiving, at the routing node from the second communication node, comprises receiving a random challenge and the identification of the update request in the verification request.

9. The method of claim 8, wherein the providing further comprises:

transmitting from the routing node to the second communication node the random challenge and a value associated with a cryptographic function provided by the first communication node as part of the verification response.

10. The method of claim 7, wherein the receiving, at the routing node from the first communication node, comprises receiving verification information including a cryptographic function applied to the update request and the identification of the update request.

11. The method according to claim 10, wherein the providing further comprises generating the verification response by providing an output derived from a cryptographic function applied on the update request.

12. The method according to claim 10, wherein the cryptographic function is a Hash-function.

13. A method according to claim 10, further comprising acknowledging receipt of the verification information by the routing node.

14. The method of claim 7, further comprising:
receiving an update acknowledgment from the second communication node if authenticity of the update request is verified and transmitting the update acknowledgement to the first node.

15. A method for facilitating communication between a remote node of a network, a home agent of the network, and a communications node of the network, the remote node being associated with the home agent, the method comprising:
receiving, at the communications node, a request for a routing entry update from the remote node, wherein an update request includes an identification of the update request;
verifying authenticity of the update request by transmitting, from the communications node to the home agent, the request for verification including a random challenge and the identification of the update request; and
updating a routing entry if the authenticity of the request is verified with a verification, wherein the verification comprises the identification of the update request.

16. The method of claim 15, further comprising:
receiving, from the home agent, a verification response including information previously transmitted to the home agent by the remote node, wherein the receiving includes: receiving the random challenge transmitted from the remote node to the home agent and a function of address information of the communications node.

17. The method of claim 15, wherein the updating comprises:
applying a cryptographic function to the update request;
comparing an output of the cryptographic function to a hashed value included in a verification response received from the home agent; and
creating a binding cache entry associated with the remote node address information indicated in the update request, if the output of the cryptographic function is the same as the hashed value.

18. The method of claim 15, further comprising:
transmitting an update acknowledgment to the remote node of the network if the authenticity of the request is verified.

19. The method of claim 15, wherein the remote node is a mobile node.

* * * * *

UNITED STATES PATENT AND TRADEMARK OFFICE
CERTIFICATE OF CORRECTION

| | | |
|---|---|---|
| PATENT NO. | : 8,175,037 B2 | |
| APPLICATION NO. | : 12/575129 | |
| DATED | : May 8, 2012 | |
| INVENTOR(S) | : Le et al. | |

It is certified that error appears in the above-identified patent and that said Letters Patent is hereby corrected as shown below:

On Page 2, item (56), under "OTHER PUBLICATIONS", in Column 1,
Line 12, delete "IPV6" and insert -- IPv6 --, therefor.

In Figure Number 1, below the Figure, insert -- Fig. 1 --.

In Column 3, Line 6, delete "specifications" and insert -- specifications. --, therefor.

In Column 3, Line 39, delete "of" and insert -- of: --, therefor.

In Column 4, Line 18, delete "the a routing" and insert -- a routing --, therefor.

In Column 4, Line 32, delete "messages;" and insert -- messages: --, therefor.

In Column 5, Line 2, delete "Bus" and insert -- BUs --, therefor.

In Column 9, Line 16, in Claim 13, delete "A method" and insert -- The method --, therefor.

Signed and Sealed this
Thirty-first Day of July, 2012

David J. Kappos
*Director of the United States Patent and Trademark Office*